Dec. 20, 1949  F. W. BOWEN  2,491,949
DUAL-SPEED DRIVE FOR PHONOGRAPHS
AND SOUND RECORDING MACHINES
Filed Oct. 2, 1947

INVENTOR.
Felix W. Bowen
BY
Ralph B. Stewart
ATTORNEY.

Patented Dec. 20, 1949

2,491,949

UNITED STATES PATENT OFFICE 2,491,949

DUAL-SPEED DRIVE FOR PHONOGRAPHS AND SOUND RECORDING MACHINES

Felix W. Bowen, Chevy Chase, Md., assignor to Bowen and Company, Inc., a corporation of Delaware Application October 2, 1947, Serial No. 777,545

3 Claims. (Cl. 74—721)

This invention relates to a dual-speed drive suitable for phonographs and sound recording machines.

An object of the invention is to devise an arrangement for driving the turntable of a sound machine at two different speeds and to provide a simple control arrangement for quickly changing from one speed to the other.

A more specific object of the invention is to devise an arrangement for driving the turntable from two separate motors, and to provide a simple control system having a single control member movable between two operative positions to connect one or the other of the two motors in driving relation with the turntable. The control member is also arranged to operate a double-pole switch to energize the motor which is in operative engagement with the turntable and to open the circuit of the other motor.

Figure 1:
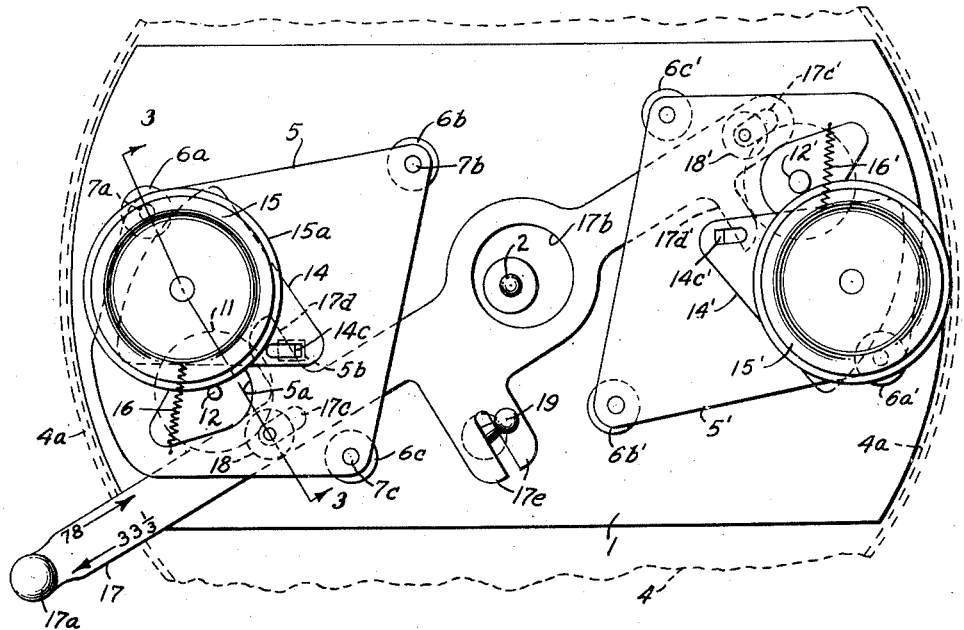
Figure 2:
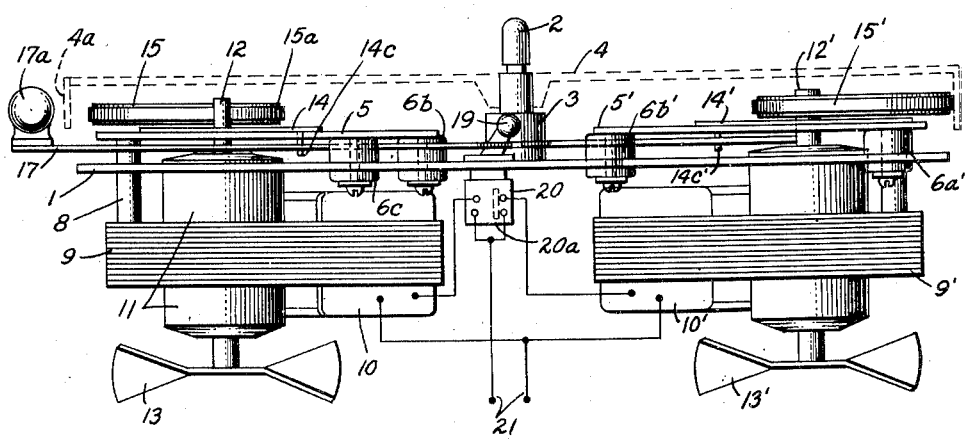
Figure 3:
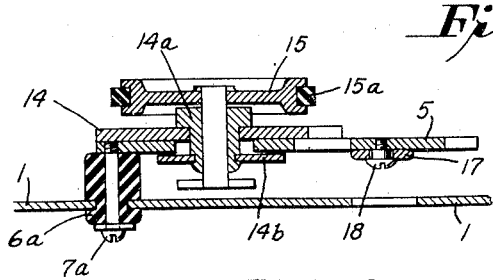

One embodiment of the invention is illustrated in the accompanying drawing in which Figure 1 is the plan view of the dual motor drive, the turntable being shown in broken outline;

Figure 2 is a side elevation of Figure 1, the turntable being shown in dotted line; and Figure 3 is a sectional view taken along the cutting plane 3—3 of Figure 1.

Referring to the drawing, 1 indicates a base plate which constitutes a supporting frame for the dual motor drive and which is to be secured to a horizontal board or wall located at or near the top of a suitable enclosing cabinet not shown. At the center of the plate 1 a rotary spindle 2 is mounted in a suitable bearing 3 carried by the plate, and the turntable 4 (shown in dotted lines) is carried by the spindle 2 and is provided with a depending cylindrical rim 4a.

On opposite sides of the spindle 2 are mounted two independent motor drives employing motors of the synchronous type. Since these two motor drives are duplicates except for the diameters of the driving ends of the two motor shafts, only one motor drive will be described, and the second motor drive will be indicated on the drawing by the same reference numerals primed.

Each motor drive is constructed as a unit and is supported on the plate 1 by suitable resilient supports to be described. The drive unit includes a supporting plate 5 arranged above the plate 1 and supported at three different points by resilient grommets 6a, 6b and 6c. These grommets are preferably formed of rubber and pass through holes formed in the plate 1 in the manner indicated at 6a in Figure 3. Suitable screws 7a, 7b and 7c pass upwardly through the grommets 6a, 6b and 6c and have threaded engagement with the plate 5. The holes in plate 5 in which the grommets are located are of smaller diameter than the external diameter of the grommets, and the plate 1 is positioned within circular grooves formed in the grommets at a point intermediate the ends thereof as shown in Figure 3. An electric motor is located below the plate 1 and is suspended from the plate 5 by suitable suspension rods 8, one of which is shown in Figure 2. These rods pass through enlarged holes in plate 1 and are attached at their lower ends to the laminated field structure 9 of the motor having an energizing winding 10. The armature of the motor is journalled in suitable bearing bells 11 mounted on opposite sides of laminated field 9, and the armature has a vertical shaft 12 which extends upwardly through a hole in plate 1 and through an opening 5a in plate 5. The lower end of the motor shaft is provided with a ventilating fan 13 for blowing air upwardly against the motor.

Positioned on top of plate 5 is plate 14 of generally triangular shape, although it may be of a different shape. An idler wheel 15 is journalled in the plate 14 by means of a bearing sleeve 14a secured in a hole in the plate 14 and extending through an enlarged hole in the plate 5 as shown in Figure 3. The washer 14b is carried on the lower end of the sleeve 14a below the plate 5 and holds the plate 14 in position on the plate 5 while permitting sliding of the plate 14 over the surface of the plate 5 in all directions, limited only by the size of the hole in plate 5. A depending finger 14c is provided near the inner corner of the plate 14, Figure 1. This finger extends downwardly through an elongated slot 5b formed in plate 5. This finger provides a pivot point for the plate 5, and this point is slidable along the axis of the slot 5b, thus permitting the idler wheel 15 to move generally radially of the plate 1.

The wheel 15 is provided with a rim 15a formed of rubber or other suitable material to increase the friction of the wheel against engaging surfaces.

A tension spring 16 is secured between the lower edge of plate 14 in Figure 1 and a point on the plate 5 to move the plate 14 so that the rim 15a of the wheel 15 engages the motor shaft 12 and also tends to engage the cylindrical rim 4a of the turntable 4, unless movement of the plate 14 is restrained. By referring to Figure 1 it will be seen that the wheel 15' of the right hand motor drive is in engagement with the motor shaft 12' and with the turntable rim 4a, but the wheel 15 of the left hand motor drive is held out of engagement with the rim 4a by an arrangement now to be described.

Control slide or bar 17 provided with a control knob 17a is arranged above the plate 1 and extends diametrically across the plate as shown in Figure 1. The spindle 2 and the bearing 3 pass through an enlarged hole 17b formed in an enlarged portion of the bar 17, thereby permitting limited movement of the bar 17 in the direction of its axis. The bar 17 is suspended from the two plates 5 and 5' by an arrangement permitting limited movement of the bar along the axis thereof, such as by means of two screws 18 and 18' passing upwardly through elongated slots 17c and 17c' formed in the bar 17 and having threaded engagement with the plates 5 and 5'. The bar 17 is provided with an arm 17d extending to one side and arranged to engage the depending finger 14c when moved in the direction of the arrow 78, and to thereby move the plate 14 to disengage the wheel 15 from the turntable rim 4a. A similar arm 17d' extends laterally from the bar 17 in the opposite direction and is arranged to engage the depending finger 14c' and move the wheel 15' away from the turntable rim 4a when the bar 17 is moved in the direction of the arrow 33⅓.

From the foregoing it would be understood that when the control bar 17 is shifted in the direction of the arrow 78, the arm 17d disengages the wheel 15 from the turntable rim 4a, and the arm 17d' moves away from the finger 14c' and allows the spring 16' to move the wheel 15' into engagement with the rim 4a. In this position of the bar 17 the right hand motor unit is connected in driving relation with the turntable, and the diameter of the motor shaft 12' is of the proper value for driving the turntable at a speed of 78 revolutions per minute. When the bar 17 is shifted in the opposite direction, the right hand motor unit is disconnected from the turntable and the left hand motor unit is placed in operative connection with the turntable, and the diameter of shaft 12 is of a proper value to drive the turntable at 33⅓ revolutions per minute.

It is not desirable to have both motors operative simultaneously, and for this purpose the control bar 17 is provided with a bifurcated arm 17e extending to one side thereof and engaging the operating lever 19 of an electric switch 20 mounted on the plate 1. The switch 20 may be of any suitable double-pole construction for closing the circuit to one motor in one position and opening the circuit of the other motor. A suitable construction is illustrated diagrammatically in Figure 2 in which operation of the switch arm 19 to the right in Figure 1 serves to shift the bridging element 20a to bridge one pair of contacts in the circuit of the right hand motor and to bridge a pair of contacts in the circuit of the left hand motor when the bar 17 is moved to the left. It will be understood that the motor units are energized from a suitable alternating current circuit represented at 21. Since the two motors are of the synchronous type, the proper speed of the turntable is maintained at all times without the necessity for adjustment.

From the foregoing it will be seen that friction wheels 15 and 15' constitute movable transmission elements for connecting and disconnecting the motors to the turntable. The bar 17 constitutes a single control member for simultaneously operating these elements in opposite directions to engage one driving connection and disengage the other.

I claim:

1. A dual-speed drive comprising, in combination, a base plate having a rotatable spindle mounted at the center thereof, a pair of motors mounted on said plate on opposite sides of said spindle, a pair of friction wheels, a pair of mounts for said wheels mounted on said plate on opposite sides of said spindle and arranged for limited sliding movement outwardly with respect to said spindle, spring means acting on each wheel mount urging said wheels into engagement with the respective shafts of said motors and tending to shift said wheels outwardly with respect to said spindle, and a common control member extending between said wheel mounts and being movable in one direction to shift one wheel mount inwardly, and movable in the opposite direction to shift the other wheel mount inwardly.

2. A dual-speed drive for the turntable of a sound machine comprising, in combination, a supporting base having a spindle rotatably mounted thereon for supporting said turntable, a pair of constant speed drive shafts mounted upon said base at diametrically opposite points with respect to said spindle and positioned inwardly from the rim of said turntable, a driving connection from one of said drive shafts to the rim of said turntable for driving said turntable at one speed, a second driving connection from the second shaft for driving said turntable at a different speed, each of said driving connections including a friction wheel interposed between the respective driving shaft and the rim of said turntable, each wheel being mounted for movement radially of said turntable, spring means normally urging each friction wheel into engagement with the respective driving shaft and with the rim of the turntable, and a common control member connected with said friction wheels and being movable in one direction to disengage one friction wheel from said turntable and being movable in the opposite direction to disengage the other friction wheel from said turntable.

3. A dual-speed drive for the turntable of a sound machine comprising, in combination, a supporting base having a spindle rotatably mounted thereon for supporting said turntable, a pair of constant speed drive shafts mounted upon said base at diametrically opposite points with respect to said spindle and positioned inwardly from the rim of said turntable, a pair of friction wheels interposed between said drive shafts and the rim of said turntable, said wheels being arranged on opposite sides of the diametrical line passing through the axes of said shafts and each wheel being mounted for movement radially of said turntable, spring means normally urging each friction wheel into engagement with the rim of the turntable, and a common control member connected with said friction wheels and being movable in one direction to disengage one friction wheel from said turntable and being movable in the opposite direction to disengage the other friction wheel from said turntable.

FELIX W. BOWEN.

REFERENCES CITED

The following references are of record in the file of this patent:

UNITED STATES PATENTS

| Number | Name | Date |
|---|---|---|
| 1,370,899 | Molesworth | Mar. 8, 1921 |
| 2,097,071 | Lichten | Oct. 26, 1937 |
| 2,325,602 | Gay | Aug. 3, 1943 |
| 2,392,193 | Schneider | Jan. 1, 1946 |